(12) United States Patent
Kosmowski

(10) Patent No.: US 9,050,661 B1
(45) Date of Patent: Jun. 9, 2015

(54) CENTRIFUGAL COLLET FOR HIGH SPEED OPERATION

(71) Applicant: Wojciech B. Kosmowski, San Juan Capristrano, CA (US)

(72) Inventor: Wojciech B. Kosmowski, San Juan Capristrano, CA (US)

(73) Assignee: INTERDYNE SYSTEMS INC, Grand Cayman (KY)

( * ) Notice: Subject to any disclaimer, the term of this patent is extended or adjusted under 35 U.S.C. 154(b) by 0 days.

(21) Appl. No.: 14/303,891

(22) Filed: Jun. 13, 2014

(51) Int. Cl.
*B23B 31/14* (2006.01)
*F16D 43/18* (2006.01)

(52) U.S. Cl.
CPC .............. *B23B 31/14* (2013.01); *B23B 2231/20* (2013.01); *B23B 2270/04* (2013.01); *Y10T 279/17213* (2015.01); *Y10T 279/17418* (2015.01); *F16D 43/18* (2013.01); *Y10T 279/247* (2015.01)

(58) Field of Classification Search
CPC ......... B23B 31/14; F16D 43/14; F16D 43/18; Y10T 279/247; Y10T 279/17418; Y10T 279/17213

USPC ............... 279/33, 43.1, 43.5, 46.2, 46.5, 129, 279/131; 192/105 CF
See application file for complete search history.

(56) References Cited

U.S. PATENT DOCUMENTS

| | | | | |
|---|---|---|---|---|
| 3,975,029 | A | * | 8/1976 | Benjamin ...................... 279/131 |
| 4,802,680 | A | * | 2/1989 | Fuchs .............................. 279/33 |
| 4,821,859 | A | * | 4/1989 | Suchdev et al. ......... 192/105 CD |
| 5,997,223 | A | * | 12/1999 | Kosmowski ................... 408/124 |
| 6,443,462 | B2 | * | 9/2002 | Tempest ........................ 279/131 |
| 7,547,168 | B1 | * | 6/2009 | Kosmowski .................. 409/231 |
| 8,141,884 | B2 | * | 3/2012 | Retzbach ...................... 279/131 |
| 2011/0200386 | A1 | * | 8/2011 | Kimman et al. .............. 403/373 |

* cited by examiner

*Primary Examiner* — Eric A Gates
(74) *Attorney, Agent, or Firm* — Mark S Hubert

(57) ABSTRACT

A collet formed as a unitary metal or steel cylinder machined so as to allow three identical weights, joined by three identical flexures to reside, equally spaced about the axis of rotation of the collet. The weight's outer surface is defined by a single length radius having a pair of centers including the collet's axis of rotation. As the spindle revolves, kinetic energy built up in the weights forces the leading edge of the weights outward from the axis of rotation until some portion of the outer face of the weights frictionally engage the inner surface of the spindle shaft. The trailing edge of the mass of the weights deflects inward thus gripping the machine bit tighter.

17 Claims, 10 Drawing Sheets

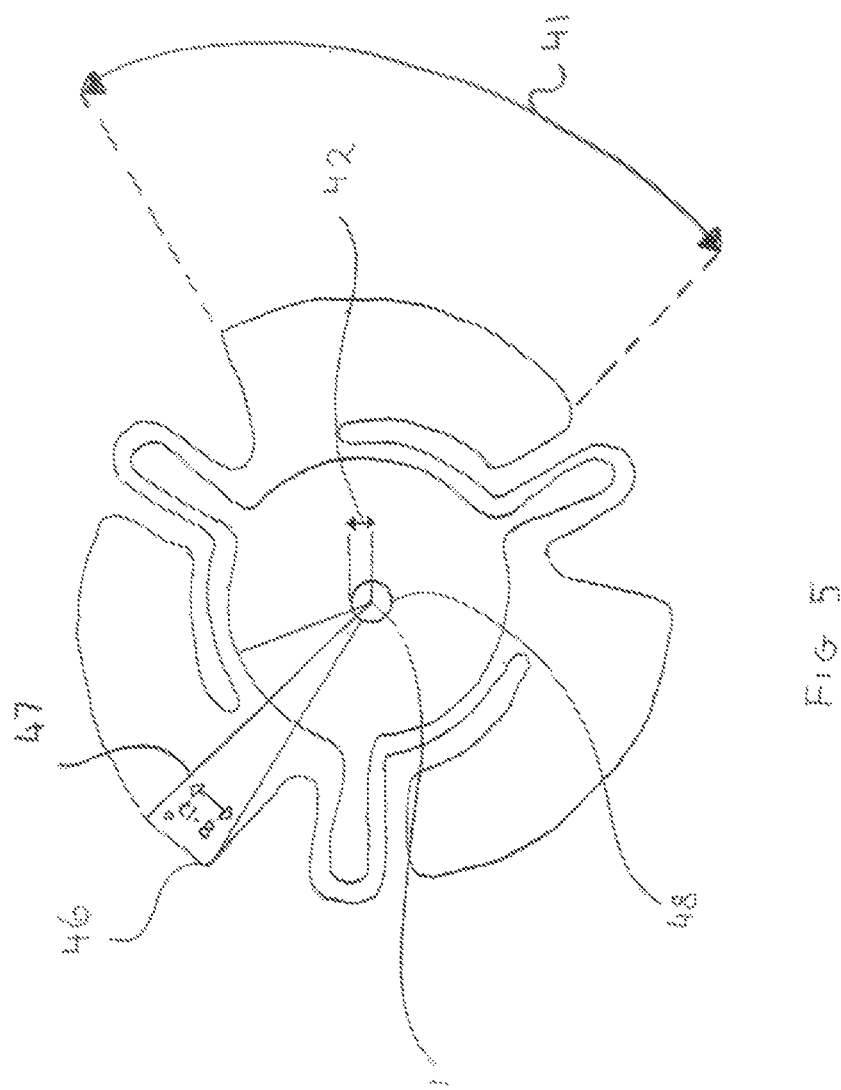

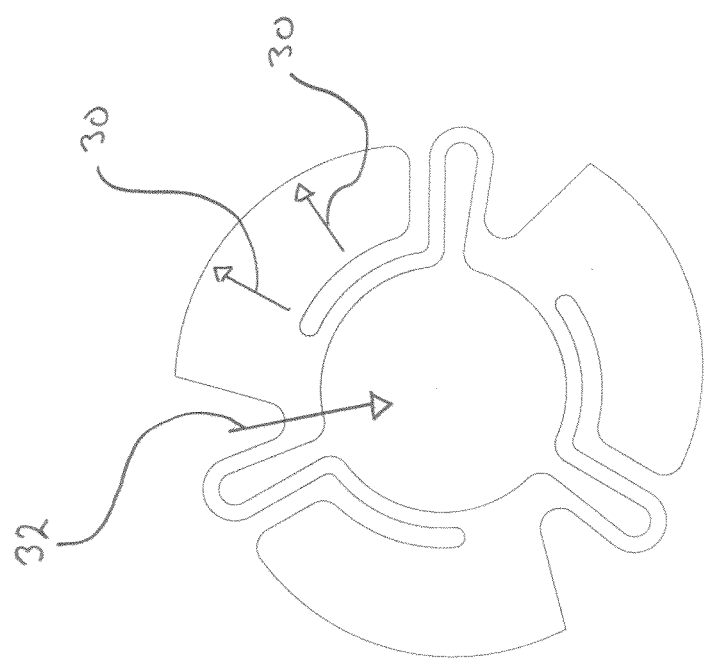

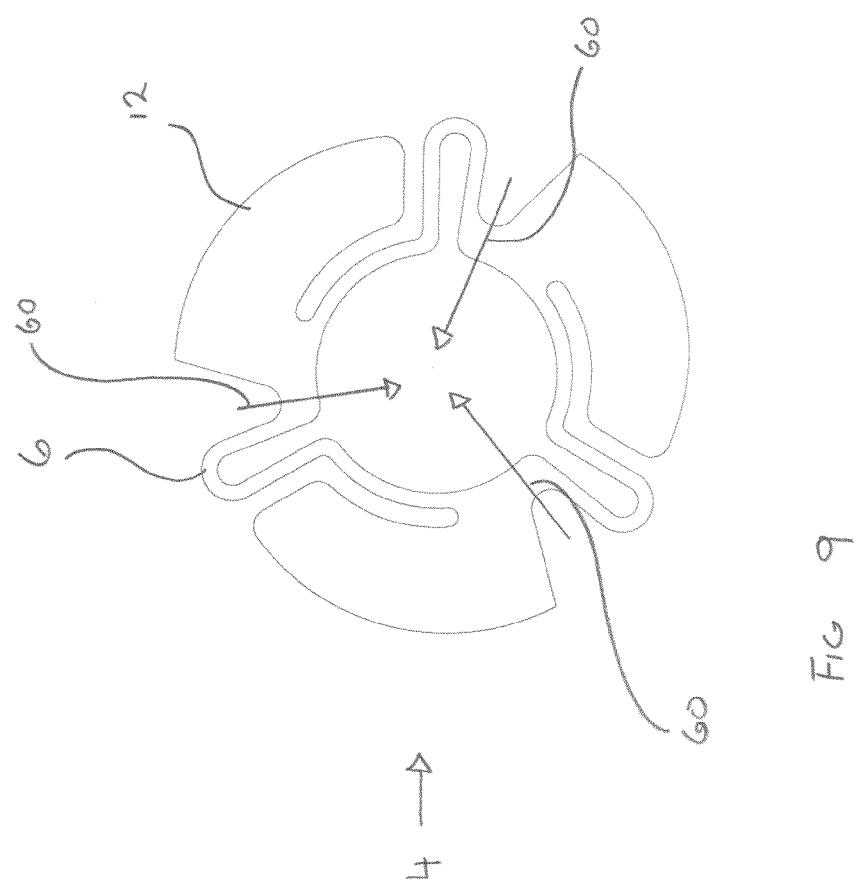

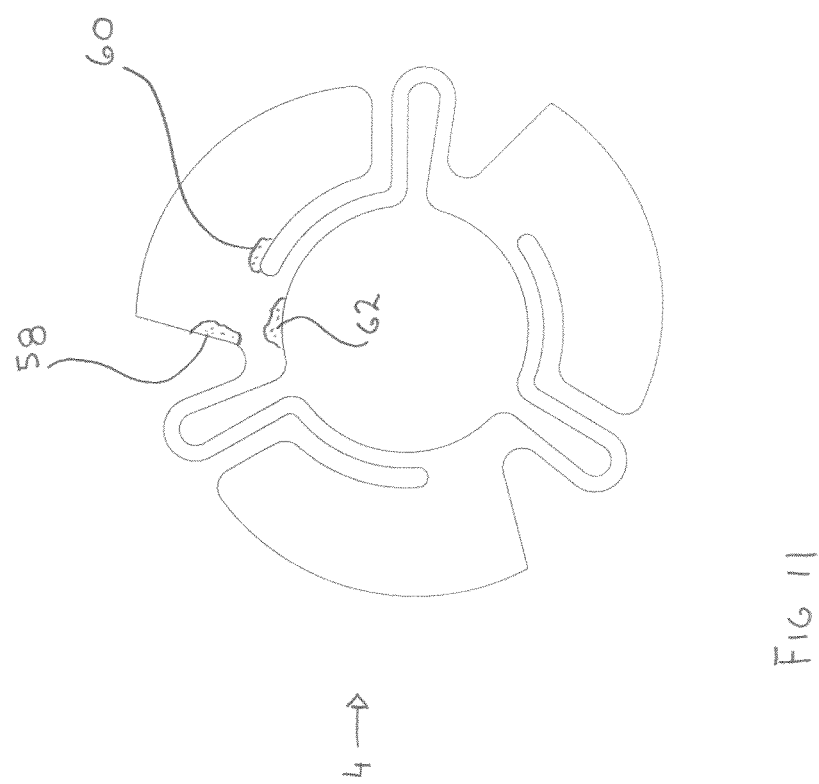

CENTRIFUGAL COLLET FOR HIGH SPEED OPERATION

BACKGROUND OF THE INVENTION

The present invention involves a novel design for an improved centrifugal collet adapted for use in a high speed drilling or machining apparatus, the like of which may be utilized in a commercial printed circuit board (PCB) drilling unit. It greatly increases the gripping power and the accuracy of the centering of the tool bit held within the collet as well as allowing for quicker tool bit changes.

Commercial PCB fabrication requires the drilling of numerous holes often in the micron range and at very specific spacing's and depths. The accuracy of this is dependant on the precise centered placement of the drill bit within the collet. The drilling is done in rapid succession, generally with numerous z-axis drilling assemblies affixed to a single moving arm and at drilling cycles lasting a fraction of a second each. The drill bits used dull and need to be replaced on a frequent basis. Time lost in changing the tool in the collet reduces production. Prior art collets for high speed commercial production drilling or machining apparatuses utilize numerous parts and generally are of the air actuated, spring loaded tapered collet design. These have several drawbacks. With many parts moveable, during operation it is it is easy for parts to shift their locations slightly. This creates a problem as the collet can get out of balance. In high speed rotation (up to 400,00 RPM) this can have disastrous, self destructing effects to the collet and spindle. With increasing RPM on the traditional taper style collet, the grip on the tool bit relaxes.

Henceforth, a centrifugal collet for holding machine tools (such as a drill bit) in a high speed drilling or machining apparatus with decreased runout and increased gripping force that is capable of faster changeout times would allow for, faster and deeper drilling (increased PCB substrate stack heights), longer drill bit life, less drill bit breakage and a higher machine throughput. This would fulfill a long felt need in the substrate drilling and surface patterning industry. This new invention utilizes a unitary centrifugal collet that combines known and new technologies in a unique and novel configuration to overcome the aforementioned problems of the prior art PCB drilling systems.

SUMMARY OF THE INVENTION

The present invention, which will be described subsequently in greater detail, relates to an improved, unitary centrifugal collet for holding a machine tool in a high speed drilling apparatus for use on a commercial printed circuit board (PCB) drilling unit, adapted to enable a higher throughput. It has many of the advantages mentioned heretofore and many novel features which are not anticipated, rendered obvious, suggested, or even implied by any of the prior art, either alone or in any combination thereof.

In accordance with the invention, an object of the present invention is to provide a centrifugal collet that grips the tool bit with an increased force as the RPM increase.

It is another object of this invention to provide a centrifugal collet that allows for reduced tool change times.

It is another object of this invention to provide a centrifugal collet that allows for more precise centering of a machine tool within the collet.

It is another object of this invention to provide a centrifugal collet that has a minimal effect on the deformation of the spindle shaft.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

BRIEF DESCRIPTION OF THE DRAWINGS

FIG. 5 is an end view illustrating the location of the center points of the radiuses of the interior and exterior surfaces of the improved collet;

FIG. 6 is an end view illustrating the location of the forces exerted on the collet weight and flexure of the improved collet under high speed rotation;

FIG. 9 is an end view of the improved collet showing the location of distortion effects to the flexure positions as a result of the residual strain of the unitary cylinder design of the improved centrifugal collet;

FIG. 11 is an end view of the improved collet showing the size and zones of stresses incurred at rotational speed of 400,000 rpm.

DETAILED DESCRIPTION

Figure 1:
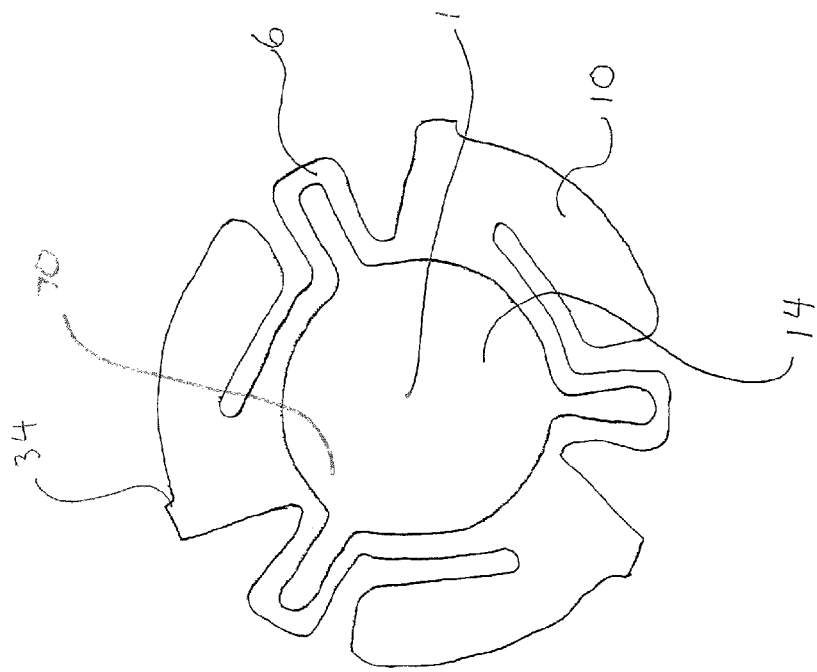
FIG. 1 is an end view of a prior art centrifugal collet.
Figure 2:
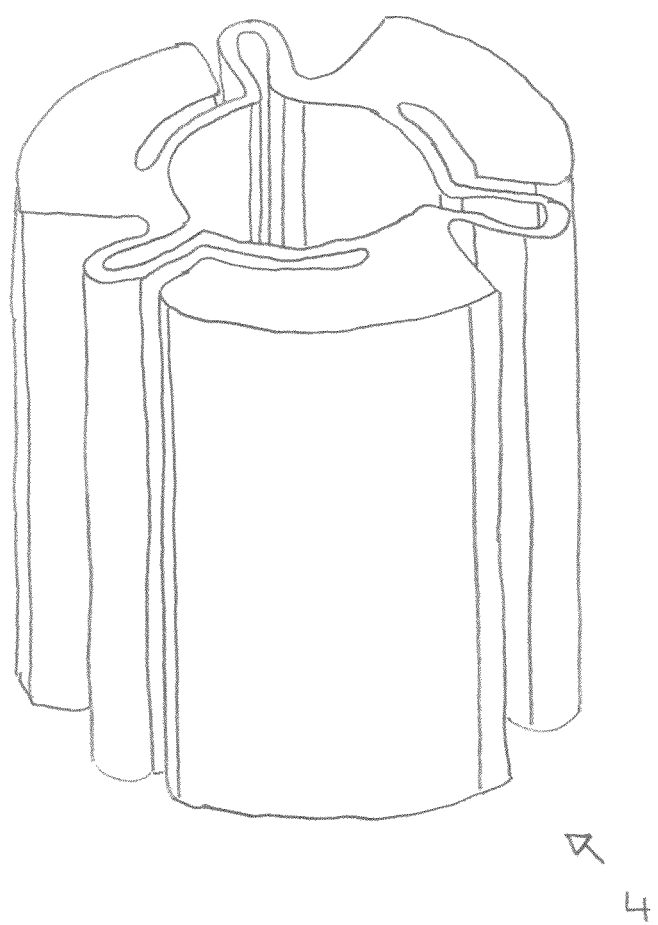
FIG. 2 is an end view of the improved centrifugal collet.
Figure 3:
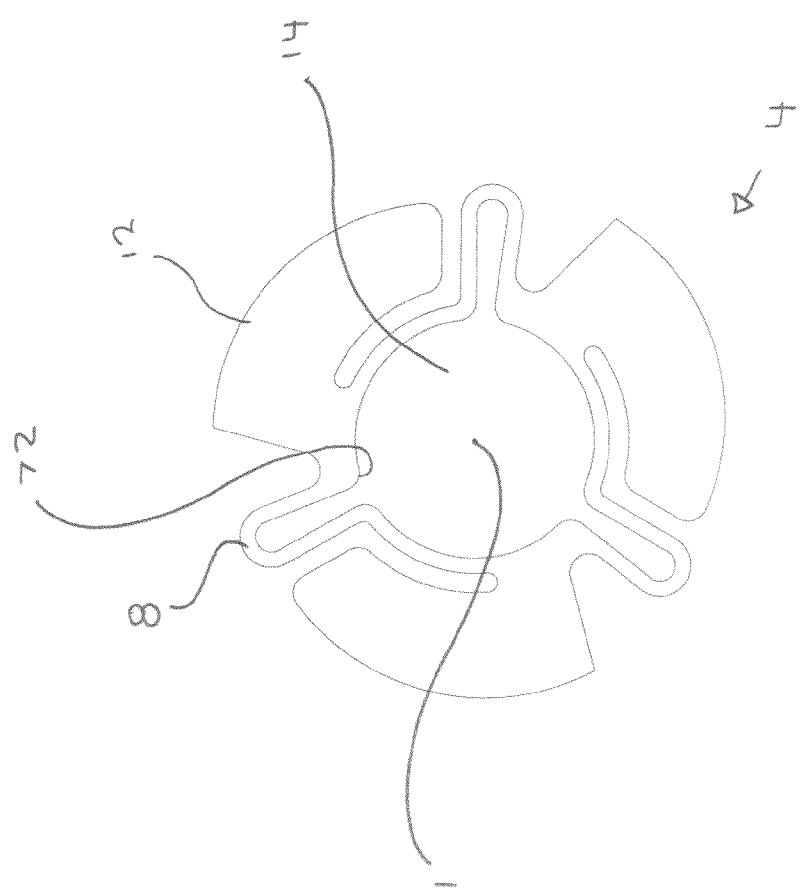
FIG. 3 is a perspective view of the improved collet.
Figure 4:
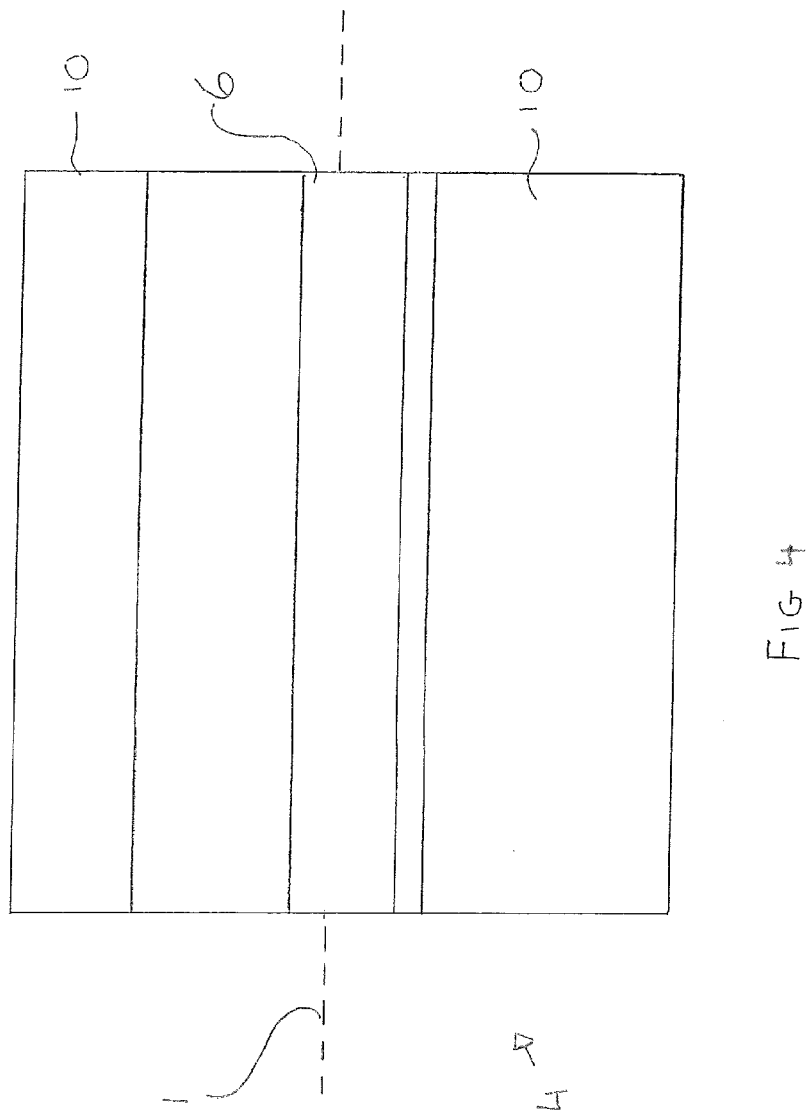
FIG. 4 is a side view of the improved collet.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is to be noted that all illustrations of FIGS. 1-11 look at the collets from the spindle end, which is the end of the collet that the tool bit extends therefrom. The direction of rotation for normal operation looking at the collets from this end is counterclockwise.

Centrifugal collets have been in existence for some time. Examples of such collets are found in U.S. Pat. No. 6,443,462 (Tempest), U.S. Pat. No. 7,547,168 (Kosmowski) and U.S. Pat. No. 5,997,223 (Kosmowski). The following improved centrifugal collet utilizes some of the basic concepts of the inventor's prior art centrifugal collet of U.S. Pat. No. 7,547,168 but incorporates geometric modifications which both enhance the gripping and centering aspects and avoids the mechanical fatigue failures.

Looking at FIGS. 1, and 2-4 the prior art collet 2 and the improved collet 4 can best be illustrated. The basic embodiment of both the prior art centrifugal collet 2 and the improved centrifugal collet 4 is a hollow cylindrical mechanism with a central bore 14 that is formed from a single metal or steel cylinder so as to form a unitary sleeve matingly sized to the internal diameter of a spindle shaft 3 (FIGS. 7 and 8) for frictional engagement therein. Each collet 2 and 4 is configured so as to have three identical weight sections (weights) 10 and 12 equally situated and spaced with respect to the linear axis 1 of the collet. The linear axis of the collet is also the axis of rotation 1 of the collet. It also has three identical flexure sections (flexures) 6 and 8 connecting the weights. The flexures 6 and 8 are of a thinner, longer configuration that the weights 10 and 12.

Stated in different terms, the centrifugal collets 2 and 4 both are of a unitary cylinder, formed from a single piece of material. This cylinder is made of a series of three identical weights 10 and 12 connected by three identical flexures 6 and 8. There is the same number of flexures 6 and 8 as weights 10 and 12. These sets of alternating weights 10 and 12 and flexures 6 and 8 are equally spaced and contiguously connected so as to form a ring about the linear axis of the cylinder (which is also the axis of rotation.) Although this describes the preferred embodiments of the centrifugal chuck, it is known that alternate embodiments may have other than three sets of weights and flexures.

The configuration of the prior art collet 2 and the improved collet 4 differ in two critical areas. First, a knife edge 34 (created by the reduction of the cylinder diameter from the knife edge towards the trailing edge of the weight) runs parallel to the linear axis of the collet and lies along the trailing edge of the weight 10. (Trailing edge refers to a counterclockwise rotation of the spindle and collet as viewed from the nose end of the spindle. It is to be noted that all illustrations herein are shown from this end of the collet and the normal operation is in the counterclockwise direction. This end is nearest the workpiece or the end of the collet that the machine bit extends from.) The improved collet 4 has a smooth, unadorned surface without a knife edge. Unlike the prior art collet 2, there is no reduction in the radius of the arc of the outer surface of the weight from the radius of the outer surface of the cylinder from which the collet 4 is formed. Second, the arcs of all areas of the outside surface of the prior art collet 2 have radiuses with a center point the same as the center point of the axis of rotation (linear axis) 1 of the collet. The weight 12 of improved collet 4 has an outer surface with a descending radius that has a center point that is offset from the center point of the axis of rotation. While it is true that there is no reduction in the radius of the arc (indicated by arc arrow 41 on FIG. 5) of the outer surface of the weight 12 from the radius of the outer surface of the cylinder, the three weights do have a descending radius with respect to the center point of the axis of rotation of the collet 1. This is because the axis of each weight's outer surface radius for the first 8-12 degrees of the leading edge is the axis of rotation of the collet 1, and the axis for each weight's outer surface beyond the first 8-12 degrees of the leading edge is shifted (offset) the same distance from the center point of the axis of rotation 1 (or linear axis) of the collet. The amount of offset of the axis of the radius of the weight's outer surface from the axis of rotation of the collet 1 is equal to the distance between the trailing edge of the weight 44 and the inner diameter of the spindle shaft 3. This offset distance is shown by line 40 of FIG. 7 and line 42 of FIG. 5.

It is to be noted that the descending radius of the outer surface of the weights 12 does not begin at the tip of the leading edge 46 of the weight. It does not begin until after the first 8-12 clockwise degrees of the weight's outer surface from the leading edge of the weight looking at the collet from the spindle nose. (As illustrated in all figures.) This small section on all weights 12 is illustrated on one weight located between leading edge 46 and line 47. This represents that across all three weights, a total of 24-36 degrees of the improved collet's outer surface retains the original cylindrical radius (and surface) of the cylinder from which the improved collet 4 is formed and which is matingly conformed for an interference fit with the interior bore of the spindle shaft. This 24-36 degrees of original cylinder outside diameter that remains on the weights, accounts for the concentricity of the collet within the spindle shaft.

The width of the cylindrical portion before the start of the descending radius on the weights (the 24-36 degrees total as discussed above) determines at what RPM to the collet engages the spindle shaft's inside bore.

It is to be noted that although the preferred embodiment collet uses a descending radius on the outside surface of the weights wherein the radius remains the same length but has a first and second center points, other curves may be utilized. A parabolic or hyperbolic curve may also be used as the shape for the outside surface of the weights. These will alter the characteristics of the magnitude of the gripping force of the collet vs the RPM the collet is rotated at.

Figure 7:
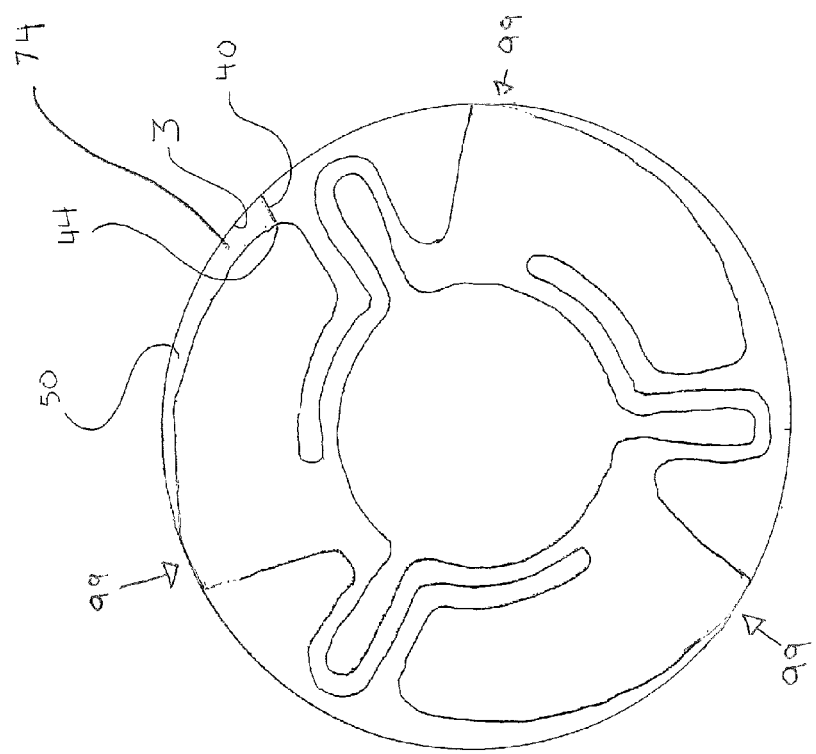

Initially as can be seen in FIG. 7, when not rotated, the only region of the collet 4 that contacts the inner diameter of the spindle shaft is the 8-12 degrees of the leading edge of each of the three weights (combined 24-36 degrees) as indicated by arrow 99. (This maintains the concentricity of the collet within the spindle bore.) As the RPMs of the collet increases the weights move out to contact the inner surface of the spindle shaft. The weights roll inside this bore as the RPMs increase. Because the first 8-12 degrees of the leading edge of the weight has a different radius center point the innermost tip of the leading edge deflects inward toward the center of the collet inner bore to grab the tool bit tighter at the region indicated by arrow 100 in FIG. 8. Since as RPMs increase the weights can only roll out further in the spindle bore, the grip the collet has on the tool bit can only tighter.

The distance and location of the offset center point for the radius of the arc for the outside surface of the weights beyond the first 8-12 clockwise degrees (the descending radius portion) from the leading edge 46, with respect to the center point of the axis of rotation of the collet, can also be described as a distance determined by the difference between a distance from the center point of the axis of rotation of the collet to the trailing edge of the weight, wherein the offset center point for any weight lies on a second line drawn from the center point of the collet's axis of rotation that extends perpendicular to a first line drawn between the leading edge of that weight and the center point of the axis of rotation of the collet. Circle 48 represents this offset distance about the center point of the axis of rotation of the collet. The center point of all the three radiuses for the three different weights will lie on this circle.

The radius of all points along the outside surface of the weights 12 is the same. It is only the center point of this radius that changes after the first 8-12 clockwise degrees from the leading edge, not the length. (This is the identical radius defined by the distance between the center point of the axis of rotation to the outermost point of the leading edge of the weight, which is the same as the radius of the cylinder from which the collet 4 is formed.) The length of the offset distance in the radius of the arc of the outer surface of the weights from the center point of the collet's axis of rotation along the second line, (shown by line 42) is equal to the distance between the trailing edge 44 of the weight's outer surface and the inner diameter of the spindle shaft 3.

The offset of the center point of the radius of the outer surface of each weight is shifted 90 degrees to the left (perpendicular) from the center point of the axis of rotation of the collet from a line drawn between the center of the axis of rotation of the collet to the furthermost point on the leading edge of the weight. The radius of the outer surface of the weight 12 is no larger than a length equal to one half of said outer diameter of said cylinder.

The basic principle of operation of both collets 2 and 4 is the same. As the spindle of the high speed drilling or machining apparatus revolves, kinetic energy is built up in the weights 10 and 12 that forces the mass of the weights outward from the axis of rotation 1 until some portion of the outer face of the weights contact and frictionally engage the inner surface of the spindle shaft 3. The flexures 6 and 8 allow this outward migration of the weights to occur because the flexures are the thinnest and weakest portion of the collet and capable of mechanical and elastically deformation. This flexure deformation is inward toward the axis of rotation. Thus, as the spindle RPM increases there are three equally spaced areas about the central bore 1, where the flexures 6 and 8 connect to the weights 10 and 12 that experience forces to reduce the internal diameter of the central bore 1. This inward tipping of the weight's inner edges 70 and 72 serves to increase the gripping strength that the collet exerts on the machine bit inserted into the central bore as well as the gripping strength the collet 4 has within the spindle shaft 3. The greater the RPM the greater the collet's internal and external gripping forces are.

FIG. 6 shows the location of the forces exerted on the weight 10 of the improved collet 4 under high speed rotation. Force directional arrows 30 show the direction of the forces acting upon the weight 10 and force directional arrow 32 shows the direction of the force acting upon the weight's inner edge 72. The structural differences between the prior art collet 2 and the improved collet 4 cause the knife edge 34 of the prior art collet 2 to be the outer surface area of the weight 6 that contacts and frictionally engages the inner surface of the spindle shaft 3. Since the improved collet's weights have no knife edges but rather have an outside surface having an uninterrupted smooth curve formed thereon with a fixed radius but having a first and second center point, the trailing edge of the weight 12 moves outward a distance approximately equal to the offset distance as shown by line 40 of FIG. 7 and line 42 of FIG. 5 such that the majority of the outer surface of the weight 12 frictionally engages the inner surface of the spindle shaft 3. (The first center point of the weight's outer surface's radius, is the axis of rotation of the collet and the second center point is offset from the axis of rotation 1 as discussed herein and termed a descending radius. This allows a more distributed load along the outer surface of the weight 12 as compared to that of a knife edge. This greatly increases the gripping power of the collet 4 to the spindle shaft 3 and the collet 4 to the machine bit while reducing the stresses experienced between the spindle shaft inner surface and the collet. (See FIGS. 10 and 11)

Figure 8:
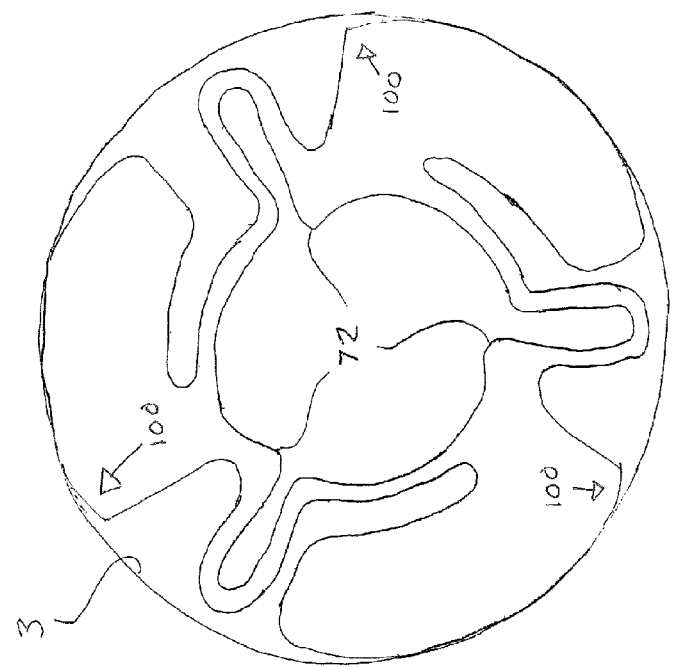
FIGS. 7 and 8 are diagrammatic views conceptually illustrating the motion of collet weights and flexures of the improved centrifugal collet in load and no load conditions.

FIGS. 7 and 8 illustrate the movement of the weights 12 and the flexures 8. It is to be noted that FIG. 7 does not illustrate a tool bit in the collet 4. Because of this the leading edges of the weights are not in contact with the spindle shaft. When the tool bit is inserted into the collet the weights spread out slightly so that their leading edge contacts the inner bore of the spindle shaft. The remainder of the weight's outer surface does not contact the inner bore of the spindle shaft when the spindle is stationary because the weight's outer surface has a descending radius. This leaves a gap 74 between the weight's trailing edge and the spindle shaft's inner bore. In FIG. 7 with the improved collet 4 stationary, the gap between the weight's outer surface and the inner surface of the spindle shaft 50 can be seen to reside along the entire outer surface of the weight beyond the first 8-12 degrees of the weight's leading edge. In FIG. 8 with the improved collet 4 at rotational speed, (no tool bit shown for clarity) it can be seen that the gap has been closed and that the majority of the outer surface of the cylindrical portion of the weight is in frictional contact with the inner surface of the spindle shaft 3 and that the weight's inner corner 72 has been moved inward. (This is an exaggeration over the normal operating geometry as FIG. 8 has no machine bit installed in the collet.)

FIG. 9 is an end view of the improved collet showing the location of distortion effects to the flexure positions as a result of the residual strain of the unitary cylinder design of the improved centrifugal collet 4. The areas indicated with force arrow 60 deflect inward (toward the collet's center of rotation) because of the residual stresses inherent in the blank cylinder the collets are cut from, and form a kind of "spring" effect with respect to the flexures. This reduces the effective inner diameter of the collet 4 (defined by the distance between the innermost points of the three distorted weights) to slightly less than the outer diameter of the machine tool shaft. However, since the upper end of the machine tool is radiused or tapered, the machine tool can be started into the collet's central bore 14 and then force the flexures 8 and weights 12 back into position as force is applied to the machine tool along the axis of rotation to insert the tool. Thus the machine tool will be frictionally held in the collet even when the spindle in not spinning.

Installation of the collet 4 is facilitated because the weights 12 collapse with the flexures 8 to conform to the bore of the spindle shaft front end during installation. A collet 4 may be changed in the spindle by removing the cap, withdrawing the old collet 4 from the bore in the spindle shaft, and placing the new collet 4 into the bore. Since the collet is small and of relatively small mass, changing of the collet will not appreciably affect the spindle's balance.

The maximum gripping force is controlled by the flexure, collet diameter and weight geometry. When this maximum gripping force occurs is a function of collet RPM and happens when the moving weights of the collets reach the bore of the spindle shaft and cannot expand anymore. Larger mass weights migrate outward at lower rpms and grab earlier. The thickness of the flexures 8 control the stiffness of the collet 4 and the shape of the weights 12 control the clamping force. By varying these parameters, the collet 4 can be designed to clamp at lower RPMs or at higher RPMs.

The improved collet 4 has many advantages over the prior art collet. It grips the inner surface of the spindle shaft 3 and the outer surface of the machine tool firmer. It is subject to much lower stresses on the flexures, and it eliminates the three point loading regions where the knife edge contacts the spindle shaft 3. Differences between these two collets are reflected in their geometry which initially may appear subtle but offers huge operational improvements.

Figure 10:
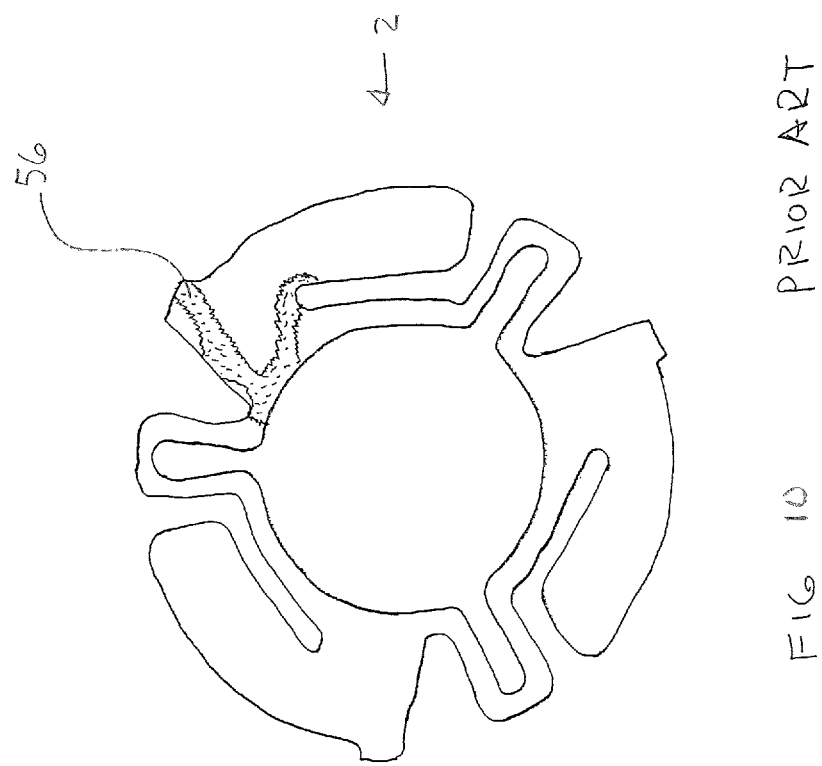
FIG. 10 is an end view of the prior art collet showing the size and zones of stresses incurred at rotational speed of 400,000 rpm.

The magnitude and location of the stresses developed in the prior art collet 2 after repeated operational cycles is illustrated in FIG. 10. As can be seen, there is a stress zone 56 that runs across the thickness of the flexure in two different regions as well as across the entire thickness of the weight 10. Looking at the improved collet 4 of FIG. 11 the stress zones 58, 60 and 62 are seen to be much smaller and localized. Stress zones that do exist in the improved collet 4 are well below the working limit of the materials of construction and have been greatly reduced over the prior art collet 2. The prior art collets 2 were experiencing stress fatigue cracks that ended their lives prematurely. This has been eliminated by the weight design of the improved collet 4.

Explained in its simplest terms, the improved collet for high speed operation transfers centrifugal force of the weights of a spinning collet, into a clamping force between the collet and the internal diameter of the bore of the spindle shaft as well as a clamping force between the internal bore of the collet and the tool bit therein, by generating leverage as a function of the geometry of the outer surface of the weights with respect to the inner diameter of the bore of the spindle shaft.

Fabrication of each of these collets 2 and 4 follow substantially similar machining steps and are fabricated as a unitary device formed form a single blank each. Such fabrication is well known in the industry by one skilled in the art of metal working and machining. Each may be manufactured separately by an electrical discharge machining (EDM) process, and all accuracy pertaining to run-out may be built into the collets before installing them into the spindle nose. An exemplary embodiment of the blank of the collet sleeve is made from tool steel which has been heat treated and tempered. After the heat treatment, the outer surface of the collet sleeve blank is ground within microns to a precise diameter and the interior bore 14 defining an ID surface, is ground and honed to ensure proper size and concentricity. This sleeve with its accurately determined ID and OD provide the finished accuracy of the collet. After the heat treatment and grind and hone operations, the EDM process may be carried out to create the flexures 8 which are defined by material removed from the sleeve blank by an EDM fabrication process. During the EDM process the OD and ID of the sleeve blank are not modified to maintain the integrity and symmetry of the precision sized collet 4 (thus controlling runout.) The weights 12 and flexures 8 are defined during the EDM process by material removed from the sleeve blank to provide the functionality of the collet. The precise machining and geometry of the weights 12 and flexures 8 allow the weights 12 to simultaneously expand in the bore of the spindle shaft 3 and clamp the machine tool shank at the same time.

A typical preferred embodiment of the improved collet 4 may have OD and ID dimensions of 6.35 mm and 3.175 mm, respectively, and a length of 7.6 mm, With a total mass of approximately 1.41 grams. Of course, other embodiments of a collet may have different dimensions and mass characteristics.

Having thus described the invention, what is claimed as new and desired to be secured by Letters Patent is as follows:

1. A collet for retention in a high speed rotary drilling or machining apparatus and for holding a machine tool therein comprising: a unitary cylinder, formed from a single piece of material having an outer diameter and a central longitudinal bore, said cylinder made of at least three equally sized, alternating, contiguously connected weights and flexures, said weights equally spaced about an axis of rotation of said collet; wherein said weights deflect when said collet is rotated at a high speed so as to grip an outside surface of a machine tool bit residing within said bore, wherein each of said weights has a smooth outside surface forming an arc between said leading edge and said trailing edge, wherein said arc forms a descending radius with respect to a first center point which is a center point of said axis of rotation of said collet, and wherein said arc has a single length radius.

2. The collet of claim 1 wherein said weight has a leading edge and a trailing edge wherein when said collet is rotated at a high speed in a counter-clockwise direction as viewed from the end of the collet from which the tool bit extends, said trailing edge moves outward and away from said axis of rotation as said leading edge moves inward and closer to said axis of rotation.

3. The collet of claim 2 wherein each of said weights have a smooth outside surface forming a descending arc between said leading edge and said trailing edge wherein said are has a single length radius.

4. The collet of claim 3 wherein said arc with said a single length radius has a first and second center point, said second center point offset from a center point of said axis of rotation of said collet.

5. The collet of claim 4 wherein said first center point is a center point of said axis of rotation of said collet.

6. The collet of claim 1 wherein said descending radius arc with said a single length radius on smooth outside surface of said weight has a second center point when in a non-rotating state, said second center point offset from a said first center point.

7. The collet of claim 6 wherein said radius is no larger than a length equal to a distance between said center point of said axis of rotation and said trailing edge of said weight.

8. The collet of claim 6 wherein said radius is no larger than a length equal to one half of said outer diameter of said cylinder.

9. The collet of claim 1 wherein said radius is no larger than a length equal to a distance between said center point of said axis of rotation and said leading edge of said weight.

10. The collet of claim 1 wherein said radius is no larger than a length equal to one half of said outer diameter of said cylinder.

11. The collet of claim 1 wherein said single piece of material has an outer diameter equal to twice the distance between said leading edge of said weight and said centerline of said axis of rotation.

12. A collet for retention in a high speed rotary drilling or machining apparatus and for holding a machine tool therein comprising:
    a unitary cylinder, formed from a single piece of material having an outer diameter and a central longitudinal bore, said cylinder made of at least three equally sized contiguously connected weights and flexures, said weights equally spaced about an axis of rotation of said collet;
    wherein said weights have a leading edge and a trailing edge and a smooth outside surface forming a descending arc between said leading edge and said trailing edge when in a non-rotating state;

wherein said weights deflect when said collet is rotated at a high speed so as to grip an outside surface of a machine tool bit residing within said bore.

13. The collet of claim 12 wherein said, descending arc has a single length radius taken from a first axis and a second axis.

14. The collet of claim 13 wherein a first leading edge section on said descending arc of said weight has a radius with said first axis, said first axis being a center point of an axis of rotation of said unitary cylinder.

15. The collet of claim 14 wherein said first leading edge section comprises 8 to 12 degrees of the descending arc of each of said weight's smooth outside surface.

16. The collet of claim 15 wherein a second section on said descending arc has said second axis that is offset from said first axis and lies on a point of a circle about said first axis.

17. The collet of claim 12 wherein the number of weights is three.

\* \* \* \* \*